Nov. 23, 1954

W. J. DEGNEN 2,695,265

INJECTION MIXER FOR USE IN CATALYTIC
HYDROCARBON CONVERSION PROCESSES

Filed April 27, 1949

*INVENTOR.*
WILLIAM J. DEGNEN
BY E. F. Liebrecht
James F. Snowden
ATTORNEYS

United States Patent Office 2,695,265
Patented Nov. 23, 1954

2,695,265
INJECTION MIXER FOR USE IN CATALYTIC HYDROCARBON CONVERSION PROCESSES

William J. Degnen, Westfield, N. J., assignor to The M. W. Kellogg Company, Jersey City, N. J., a corporation of Delaware Application April 27, 1949, Serial No. 89,877

8 Claims. (Cl. 196—52)

The present invention relates to a process and apparatus for introducing and mixing finely divided or powdered solids into fluids in order to produce a chemical reaction. More particularly, it is concerned with injecting a fluidized solid catalyst into a stream of liquid or gaseous hydrocarbons in the production of fuels for internal combustion engines.

In carrying out many chemical processes it is necessary to mix finely divided solids with either liquids or gases or both. In some cases the solid material is one of the reactants, and in others it functions as a catalyst in promoting reactions between the other substances present or in polymerizing one or more of such substances. The introduction of the powdered solid into such systems has been attended by numerous difficulties, especially in large scale operations. For example, in the petroleum refining industry, where a powdered cracking catalyst heated to 1000–1150° F. is introduced into a rapidly moving stream of air, hydrocarbon gases or vapors at rates running into hundreds of pounds of the catalyst per second in catalytic cracking and catalyst regeneration operations, serious problems of erosion are encountered by reason of the abrasive nature of the catalyst. This erosion not only requires the frequent replacement of expensive lines and fittings, but also keeps exceedingly costly equipment out of production while the new parts are being installed. By reason of their fineness and non-adhesive characteristics, such powdered catalysts may be handled similarly to fluids in many respects and are often termed fluidized solids. In the prior art, these fluidized materials have usually been introduced into conduits from closed vessels for transportation by a high velocity stream of gases by merely flowing through the branch of a T under the influence of gravity and the aspirating effect of the gas flow through run of the T. It has been found that at times a portion of the catalyst so introduced strikes the bottom of the transporting or carrier pipe slightly downstream of the T, while at other times the material sweeps out of the vertical branch along the upper section of the transporting line. This uneven dispersal of the hot catalyst on first entering the carrying stream results in intense erosion at the places mentioned. Also, erosion is observed at times in the vertical portion or standpipe due to eddies created by the carrying medium. In an effort to alleviate this condition, wear plates are commonly welded onto the interior of the conduit at the localities referred to; but even so, the abrasive action frequently wears holes through these re-enforced portions of the line thereby necessitating the use of external patches. In addition severe bumping or vibration is set up when large quantities of the powdered solids are introduced into the stream in the manner described above. The present invention corrects these difficulties to a large extent by injecting the finely divided catalyst into the hydrocarbon stream in such manner as to minimize erosion and bumping. It also affords a means of measuring the quantity of catalyst added per unit quantity of gases.

An object of the invention is to provide an improved process and apparatus for dispersing finely divided solids in gases, vapors, liquids or mixtures thereof, such as mists or fogs, to produce chemical reactions.

A second object of the invention is to provide a process and apparatus device for minimizing erosion in pipe lines and conduits upon the introduction of finely divided solids into fluids to produce chemical reactions.

A third object of the invention is to provide a method and means for measuring the quantities of solids in the process.

Other objects of the invention will, in part, be obvious and will, in part, appear hereinafter.

This invention is concerned with apparatus and a process for intimately mixing a finely divided solid into one or more flowing fluids to produce a chemical reaction comprising a conduit for the fluid in which a throat section of minimum cross-section adjoins a downstream diverging section of gradually increasing cross-section and discharge means in the conduit for introducing finely divided solids and having an orifice facing downstream located near enough to the junction of the two sections mentioned to avoid impingement of the solids on the throat. It is also proposed to provide means for introducing a second fluid along with the solids into the first fluid. The invention accordingly comprises the features of construction, combinations of elements, arrangements of parts and manner of operation, which will be exemplified in the detailed description herein, and the scope of the invention will be indicated in the claims.

The construction, operation and objects of the present invention are best understood by reference to the accompanying drawings in which.

Figure 1:
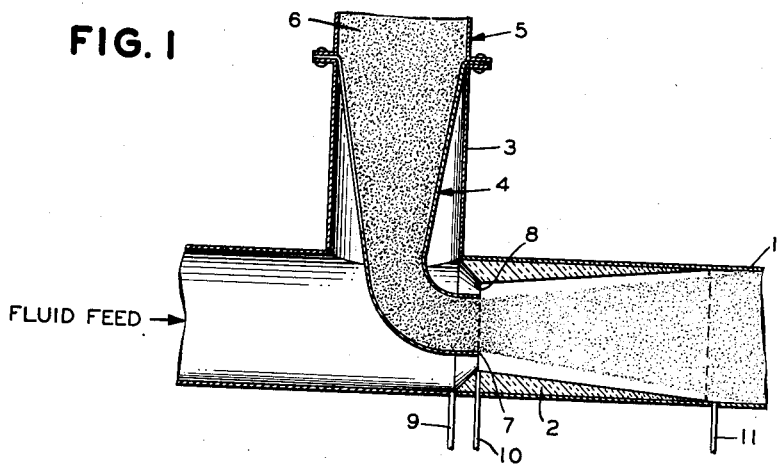
Fig. 1 is a longitudinal sectional view of the injecting and mixing device.

Referring to Fig. 1, a pipe line or conduit 1 through which gases, vapors or liquids are flowing at high velocity from left to right, contains a venturi 2. Inside the T 3 a nozzle 4 in the form of a reducing L extends from the standpipe 5 supplying a finely divided catalyst 6 to the center of the conduit. The outlet orifice 7 of the L is positioned closely adjacent to, and preferably within, the throat 8 of the venturi, and the location of this orifice or discharge opening 7 with respect to throat 8 is highly important in securing the full benefits of this invention. Although they constitute optional features, it is highly recommended that pressure taps 9, 10 and 11 be installed at the locations shown in Fig. 1 for reasons to be mentioned later. These connections permit measuring the static pressure at the inlet, the throat, and the outlet of the venturi respectively and, of course, the pressure differentials between those points. The device shown in Fig. 1 is especially adapted for injecting spent catalyst from the standpoint of a reactor in a fluid catalyst cracking system into a stream of air which carries the powder to the catalyst regenerator unit.

Figure 2:
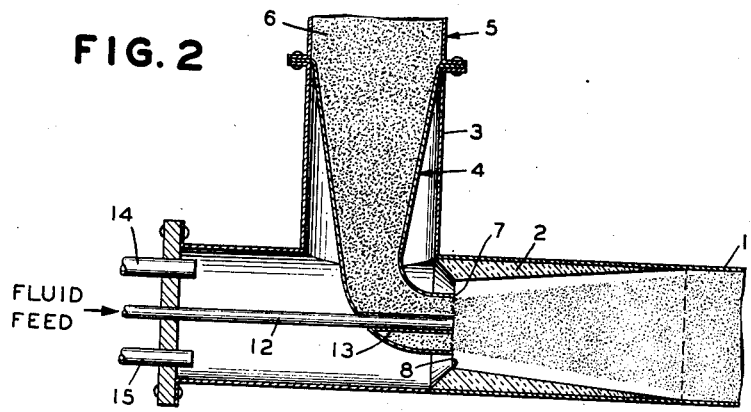
Fig. 2 is a similar view of another modification of the invention.
Figure 3:
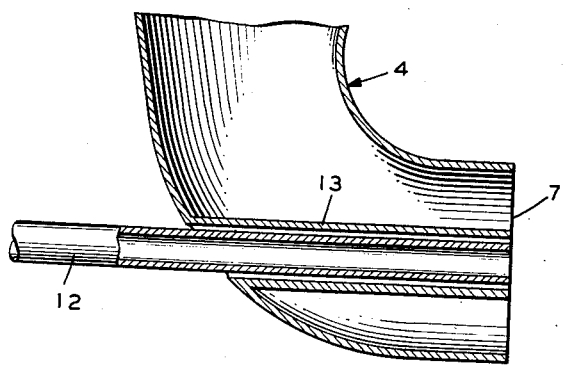
Fig. 3 is an enlarged fragmentary view of a portion of Fig. 2.

Referring to Figs. 2 and 3, this modification of the invention contains a pipe 12 slideably mounted within a concentric pipe 13 which is integral with L 4. This construction is especially adapted for the addition through line 12 of a liquid feed which is to be vaporized by the heat of the finely divided solids 6 where another feed stream consisting of gases or vapors is introduced through pipes 14 and 15. In some instances it may be desirable to introduce one liquid, gas or vapor through line 12 and another through pipes 14 and 15. The feeds through lines 12, 14 and 15 are controlled as desired by suitable valve arrangements (not shown). The modification of the invention illustrated in Fig. 2 is particularly designed for the injection of regenerated catalyst into the feed which transports it to a cracking reactor. In this use the catalyst enters the L or nozzle 4 at an elevated temperature. Accordingly the clearance shown in Fig. 3, between pipes 12 and 13, must be adequate to allow for differences in expansion in these two lines. Although these two pipes are shown as extending to the orifice 7 the exact location of the point at which the liquid mixes with the hot powder does not appear to be critical for most purposes. It is also recommended that pressure taps 9, 10 and 11 be provided for this modification of the injector for the reasons set forth hereinafter.

The novel injection mixer can be operated in any position in which the finely divided solids can be supplied to the orifice 7, by known means, usually the pressure head of the powder itself. For example, the injector may be installed not only in horizontal and inclined pipes but also in vertical carrier lines with the nozzle facing either up or down depending on the direction of fluid flow. To set the device in operation a valve (not shown) is opened in the upstream side of conduit 1 to establish the flow of fluid and a second valve (not shown) in standpipe 5 is opened to the desired extent in order to admit the finely divided solids 6 from an external source. As the stream passes through the venturi throat 8, which is the point of lowest static pressure and maximum velocity, it inducts the powder into the conduit and for a while keeps the finely divided solid material enveloped in an annular column of fluid. This fluid envelope substantially prevents the concentrated mass of powder from striking any wall surfaces until a point downstream of the venturi outlet is reached where the stream has a lower velocity due to its greater cross-section and the finely divided solids and the fluids have become evenly dispersed in the stream. It appears that erosion in systems containing finely divided solids suspended in gases is proportional to the cube of the velocity of flow and varies directly with the concentration of solids per unit volume. In practicing the present invention, when the powder does strike the surfaces of the conduit it is less concentrated, moving at a slower velocity than at the throat and impingement on the conduit is general rather than localized; and each of these three factors reduces erosion. Moreover, in catalytic processes the quicker attainment of a substantially uniform mixture of the fluid and the catalyst provides a correspondingly longer time for reaction in the presence of the catalyst. In addition it has been observed that vibration or bumping in the conduit is far less with the present device than where the powdered solid is allowed to drop through the branch of a T into a high velocity fluid stream.

In the construction of the device herein disclosed it is preferred to have all passages of circular cross-section, but the invention is not limited to this particular design, inasmuch as the various parts can be fashioned in other shapes, as for instance a rectangular conduit, and still retain to a considerable extent the advantages of the present invention. For maximum efficiency the wall of the inlet section of the venturi should be in the form of a truncated cone having an apex angle of approximately 25° and the wall of the outlet section should be in the form of a truncated cone having an apex angle of about 7°. In other words the walls of the converging and diverging sections of the venturi preferably slope at 12.5° and 3.5° respectively relative to the axis. However, different angles will be observed in Figs. 1 and 2 and this is often the case in large installations where it is not feasible to build an ideal venturi because of its great length or other construction limitations. As a general rule the major benefits of the improved injector will be realized when the slope of the diverging section is within the range from 2 to 30°, that is, a total angle of 4 to 60° at the theoretical apex; and the slope need not be constant throughout its length. The venturi segment of the conduit may be constructed in various ways; for example, it may consist of a metal shell of the proper configuration either replacing a section of the conduit or inserted in the conduit. Also, it may be made by lining the pipe with re-enforced concrete or a castable refractory in which is embedded a metal screen, expanded metal, or other suitable re-enforcement. It is also desirable to point out that while the throat of the venturi is shown in the accompanying illustrations as a circle, that cylindrical throats of substantial length are often used in venturis and the venturi employed here may be so fashioned. Accordingly the expressions throat and throat section are used herein to denote either type of throat.

While a venturi forms a part of each of the injectors described herein the complete venturi is not an essential part of the invention; for example, in both Figs. 1 and 2 the portion of conduit 1 upstream of orifice 7 could have the same internal diameter as throat 8. The essential features of the present invention are a means for introducing finely divided solids at the interior of a hollow column of air followed by a passage of gradually increasing cross-section.

The location of the orifice 7 is critical in obtaining the full benefits of this invention, for it determines the characteristics of the impingement of the powder on the passage. It is preferably located in the throat 8 of the venturi, for at this point the fluid is at its maximum velocity and, therefore, exerts the greatest suction effect on the orifice. This minimizes the necessary build-up of standpipe pressure head to offset the pressure drop encountered in powder circulation systems. Even more important is the fact that this location minimizes erosion as described previously. Impingement of the finely divided solids on the throat must be prevented and it has been found that this can be accomplished by locating the plane of the orifice 7 not more than two-thirds of the throat diameter from the junction of the throat and the downstream diverging section of the passage. Placing the orifice a greater distance downstream results in an undesirable eddying of the fluid powder mixture. In the case of a long venturi throat, locating the orifice too far upstream in the throat will result in the powder impinging on the throat. Although it is not as desirable as a location in the throat, the orifice may be positioned in the converging section slightly upstream of the throat without causing impingement on the throat provided that it is not more than from one-tenth to one-quarter of the throat diameter upstream, depending on the slope of the converging section, of the throat and not more than two-thirds of the throat diameter upstream of the diverging section.

The diameters of the orifice 7 and the throat 8 are determined by the needs of the particular installation. The fluid velocity in the throat must be substantially in excess of that required to disperse and transport the powder in order that the velocity in the larger conduit 1 will be sufficient to carry the solids in suspension. In handling cracking catalysts, it is recommended that the throat be designed to produce a static pressure drop of approximately one inch of mercury between taps 9 and 10. This will provide a fluid velocity of about 150 to 250 feet per second at the throat in large commercial installations when the flowing medium is air at atmospheric conditions. For other purposes, it may be desirable to have a pressure drop ranging from as little as 0.25 up to 20 or more inches of mercury. Of course, the velocity will vary depending mainly on the density of the fluid employed. The orifice area should be adequate to introduce an excess of the catalyst inasmuch as the supply of this powder can best be adjusted by a valve in standpipe 5.

The introduction of the powdered catalyst into a vapor stream through a nozzle located in the inlet of a venturi having a rather long gradual sloping inlet converging section has been proposed previously, but this construction cannot achieve the results of the present invention for the powder will undoubtedly produce extreme erosion at the venturi throat due to the high velocity of flow there and also because localized concentrations of the fluidized solids in that region are far above the minimum obtained upon thorough mixing of the powder and vapor.

A further advantage of the new injector is derived from the ability to measure the injection rate of the powder by means of the pressure differentials between the pressure taps 9, 10 and 11, once the device has been calibrated. To obtain this rate it is first necessary to obtain empirical data by inserting a venturi or other suitable flow meter in the upstream side of line 1 to obtain the flow rate with air, while observing at the same time the static pressure at taps 9, 10 and 11. At various flow rates the change in the pressure differentials across taps 9, 10 and 11 are then obtained for a series of runs with varying amounts of finely divided solids introduced into the system. Alternatively, a calibration can also be made of a small model of the injector and the resulting data applied to a large scale installation of similar aerodynamic and geometric characteristics where direct calibration of the large unit is not feasible.

The mixer herein described has proven greatly superior in commercial regeneration of a cracking catalyst over an extended period over the conventional T connection for admitting the catalyst into an air stream. In one cracking unit the carrier line to the regenerator was found to be severely eroded adjacent to the T connection after operating four months, even though a wear plate had been installed to re-enforce the pipe at this point. Then the T was replaced with the device shown in Fig. 1 equipped with a venturi of refractory material; and no evidence of erosion from the highly heated catalyst as indicated by local hot spots could be detected by careful measurement of the temperatures at numerous points on the exterior of the supply line at frequent intervals during more tha ten months of continuous operation. It was also observed that far less bumping occurred in this line even though the system due to other conditions was being operated in a manner more conducive to bumping or vibration at the locality where the catalyst was injected.

Although this invention has been described principally in connection with the refining of petroleum and is particularly adaptable to apparatus for cracking, reforming, hydrogenating and polymerizing hydrocarbon gases or vapors; it nevertheless is useful for many other purposes, as for example, mixing finely divided aluminum into a stream of chlorine to form aluminum chloride. In general, any powdered catalyst or reactant may be introduced and mixed into any suitable fluid to produce a chemical reaction by means of the device described herein.

Since the changes have been made in the above construction which embodies the invention, without departing from the scope thereof, it is intended that all matter contained in the above detailed description or shown in the accompanying drawings shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described my invention, what I claim as new and desire to secure by Letters Patent, is:

1. A process for intimately and uniformly mixing a finely divided solid material into a fluid to produce a chemical reaction which comprises passing the fluid along a passage having a throat section of minimum cross-section at a velocity substantially in excess of that required to disperse and transport the solid material in the fluid, introducing the solid material at substantially the center of the fluid stream, and thereafter gradually expanding the cross-sectional area of the mixed stream to reduce its excess velocity while transporting and maintaining the solid material in substantially uniform dispersion, the solid material being introduced at a point within two-thirds of the minimum dimension across the throat section from the beginning of the zone of expansion of cross-sectional area and not more than one-quarter of said minimum dimension upstream of the throat section.

2. A process for intimately and uniformly mixing a finely divided solid material into a fluid to produce a chemical reaction which comprises passing the fluid through a throat section of minimum internal diameter in a passage of substantially circular cross-section at a velocity substantially in excess of that required to disperse and transport the solid material in the fluid, introducing the solid material at the interior of an annular portion of the fluid stream, and thereafter gradually expanding the cross-sectional area of the mixed stream to reduce its excess velocity while transporting and maintaining the solid material in substantially uniform dispersion, the solid material being introduced at a point within two-thirds of the throat diameter from the beginning of the zone of expansion of cross-sectional area and not more than one-quarter of the diameter of the throat section upstream of the throat section.

3. A process for intimately and uniformly mixing a finely divided solid material into a fluid to produce a chemical reaction which comprises passing the fluid through a venturi at a velocity substantially in excess of that required to disperse and transport the solid material in the fluid, introducing the solid material at the interior of an annular portion of the fluid stream, and thereafter gradually expanding the cross-sectional area of the mixed stream to reduce its excess velocity while transporting and maintaining the solid material in substantially uniform dispersion, the solid material being introduced through a substantially circular orifice facing downstream and located within two-thirds of the venturi throat diameter from the junction of the throat and the downstream diverging section of the venturi and not more than one-quarter of the throat diameter upstream of the venturi throat.

4. A process for intimately and uniformly mixing a finely divided solid material into a fluid to produce a chemical reaction which comprises passing the fluid through a venturi at a velocity substantially in excess of that required to disperse and transport the solid material in the fluid, introducing the solid material into the interior of an annular portion of the fluid stream inside the venturi throat, thereafter gradually expanding the cross-sectional area of the mixed stream to reduce its excess velocity while transporting and maintaining the solid material in substantially uniform dispersion, and adjusting the flow rates of the fluid and the solid material to provide predetermined static pressure differentials between the inlet and throat and between the throat and outlet of the venturi, the solid material being introduced at a point within two-thirds of the venturi throat diameter from the junction of the throat and the downstream diverging section of the venturi.

5. A process for intimately and uniformly mixing a finely divided solid material into fluids to produce a chemical reaction which comprises passing a fluid along a passage having a throat section of minimum cross-section at a velocity substantially in excess of that required to disperse and transport the solid material in the fluid, introducing hot solid material and a liquid at substantially the center of the stream of said fluid such that the liquid is substantially all vaporized, and thereafter gradually expanding the cross-sectional area of the mixed stream to reduce its excess velocity while transporting and maintaining the solid material in substantially uniform dispersion, the solid material being introduced at a point within two-thirds of the minimum dimension across the throat section from the beginning of the zone of expansion of cross-sectional area and not more than one-quarter of said minimum dimension upstream of the throat section.

6. A process for intimately and uniformly mixing a finely divided solid material into fluids to produce a chemical reaction which comprises passing a fluid through a throat section of minimum internal diameter in a passage of substantially circular cross-section at a velocity substantially in excess of that required to disperse and transport the solid material in the fluid, introducing a hot solid material at substantially the center of the stream of said fluid, introducing a liquid into said fluid at substantially the same point as the solid material whereby said liquid is vaporized, and thereafter gradually expanding the cross-sectional area of the mixed stream to reduce its excess velocity while transporting and maintaining the solid material in substantially uniform dispersion, the solid material being introduced at a point within a distance equal to two-thirds of the throat diameter from the beginning of the zone of expansion of cross-sectional area and not more than one-quarter of the throat diameter upstream of the throat section.

7. A hydrocarbon conversion process wherein a hydrocarbon reactant is contacted with a fluid mass of finely divided catalytic particles in a reaction zone thus producing converted hydrocarbon products and contaminating said catalyst with a carbonaceous deposit, and wherein at least a portion of the catalyst in the reaction zone is withdrawn for regeneration by treatment with an oxygen-containing gas in a regeneration zone; the improvement which comprises passing a fluid carrier stream through a zone having a throat section of minimum cross-sectional area at a velocity in excess of that required to disperse and transport the finely divided catalyst, introducing catalyst from one of the aforesaid processing zones into the interior of the fluid carrier stream, and passing the mixture of catalyst and fluid through a diverging zone of gradually expanding cross-sectional area to reduce the velocity and substantially avoid eddying of the said mixture while flowing through the diverging zone for passage to the other of the aforesaid processing zones, the catalyst being introduced through an injection zone facing downstream and the discharge end thereof is located within two-thirds of the throat diameter from the juncture of the throat section and the downstream diverging zone and not more than one-quarter of the throat diameter upstream of the throat section.

8. A hydrocarbon conversion process wherein a hydrocarbon reactant is contacted with a fluid mass of finely divided catalytic particles thus producing a converted hydrocarbon product and contaminating the catalyst with a carbonaceous deposit wherein at least a portion of the catalyst in the reaction zone is withdrawn for regeneration by treatment with an oxygen-containing gas in a regeneration zone; the improvement which comprises passing a fluid carrier stream through a zone having a throat section of minimum cross-sectional area at a velocity substantially in excess of that required to disperse and transport the catalyst, introducing the catalyst from one of the aforesaid processing zones into the interior of the fluid carrier stream, passing the mixture of catalyst and fluid carrier stream through a diverging zone of gradually expanding cross-sectional area to reduce the velocity and substantially avoid eddying of said mixture while flowing through the diverging zone for passage to the other of the aforesaid processing zones, the catalyst being introduced through a substantially circular injection zone facing downstream and having the discharge end situated within the aforesaid throat section of minimum cross-sectional area of the throat section and a section upstream thereof for the velocity of fluid carrier stream is sufficient to effect a static pressure drop of about one inch of mercury.

References Cited in the file of this patent

UNITED STATES PATENTS

| Number | Name | Date |
|---|---|---|
| 1,475,502 | Manning | Nov. 27, 1923 |
| 2,054,441 | Peebles | Sept. 15, 1936 |
| 2,231,424 | Huppke | Feb. 11, 1941 |
| 2,326,438 | Clarke | Aug. 10, 1943 |
| 2,486,228 | Udale | Oct. 25, 1949 |
| 2,541,662 | Palmer | Feb. 13, 1951 |

FOREIGN PATENTS

| Number | Country | Date |
|---|---|---|
| 320,391 | Great Britain | Oct. 14, 1929 |